(12) United States Patent
Simon

(10) Patent No.: US 6,497,444 B1
(45) Date of Patent: Dec. 24, 2002

(54) RADIATION SHIELD FOR OCCUPANTS OF GOLF CARTS

(76) Inventor: Alan Simon, 1547 Jayken Way, Suite C, Chula Vista, CA (US) 91911

( * ) Notice: Subject to any disclaimer, the term of this patent is extended or adjusted under 35 U.S.C. 154(b) by 0 days.

(21) Appl. No.: 09/975,716

(22) Filed: Oct. 10, 2001

(51) Int. Cl.[7] .................................................. B60J 11/00
(52) U.S. Cl. ........................................ 296/83; 296/77.1
(58) Field of Search .................................. 296/77.1, 83

(56) References Cited

U.S. PATENT DOCUMENTS 4,830,037 A * 5/1989 Held
5,975,613 A * 11/1999 Sippel
6,199,932 B1 * 3/2001 Welsh et al.
6,227,217 B1 * 5/2001 Peta

* cited by examiner

Primary Examiner—D. Glenn Dayoan
Assistant Examiner—Scott A. Carpenter
(74) Attorney, Agent, or Firm—Donald D. Mon

(57) ABSTRACT

A shield for the rear portion of a golf cart to protect the occupants from at least some UV radiation. It is a flexible somewhat transparent woven closed structure with a top panel, two side panels and a rear panel joined at edges so as to embrace the golf cart. An elongated strap at the bottom of each side panel extends beneath the seat. They are releasable joined, so that when they are joined and the seat is down, the shield is held in place, with the side rails of the golf cart unobstructed.

2 Claims, 2 Drawing Sheets

RADIATION SHIELD FOR OCCUPANTS OF GOLF CARTS

FIELD OF THE INVENTION

A conveniently attached partial shield for golf carts to give some protection to the occupant against UV radiation from the sun.

BACKGROUND OF THE INVENTION

Golf carts, because of the nature of the game in which they are employed for transportation, must inherently have a very open structure. The nearness of observers and of other players requires an openness for visibility. Sometimes, but not always, there is a roof which stops all light and radiation from directly above. However, in every case, the back and sides must be essentially open for safety of the driver and his occupants and also of nearby people.

These vehicles are relatively narrow, so the driver and occupants will necessarily sit close to an open side, exposed to radiation. This openness is also necessary to facilitate the frequent entry and exit of persons who play the game.

It is an object of this invention to provide a shield to be fitted over a portion of the golf cart in locations where it will not impede the entry and exit of the occupants, which is sufficiently transmissive of visual images, which is significantly resistant to UV radiation, and most importantly for this invention, readily mounted without interfering with safety features of the golf cart.

Covers for these general purposes are known. Examples are Sanders U.S. Pat. No. 5,843,548 and Welsh et al U.S. Pat. No. 6,199,932. While providing some of the basic utility of this invention, they involve more complexity and interference with the occupants than is desirable. It is an object of this invention to provide a shield which can readily be mounted with little effort, and which involve no interference with safety features of the invention such as the side rails.

BRIEF DESCRIPTION OF THE INVENTION

A shield according to this invention comprises a sheet-like structure having a top, a rear panel, and a pair of opposite side panels. This construction can be placed with its top panel supported by the roof of the golf cart or by a framework, with its panels depending from it in both situations. The panels extend forwardly to locations to where they will not interfere with the access or the view of the occupants. The panels and the top meet and are joined at edges.

According to this invention, at the forward end of each side panel there is a strap. These straps are of sufficient length that their combination will pass under the front seat of the cart. Joinders on the free ends of the straps enable them to be joined to form a binder that holds down the side panels when the seat is down.

There is no attachment to the chassis. Instead, the joined straps simply meet under the seats and hold down the shield. This does not engage any part of the framework, especially the side rails, which are not obscured by a tie-down device that would hold the shield down by being attached to the rails. Instead, it is fastened loosely under the seats while they are raised, and then the seat is lowered on it to hold it tightly.

The above and other features of this invention will be fully understood from the following detailed description and the accompanying drawings, in which:

DETAILED DESCRIPTION OF THE INVENTION

Figure 1:
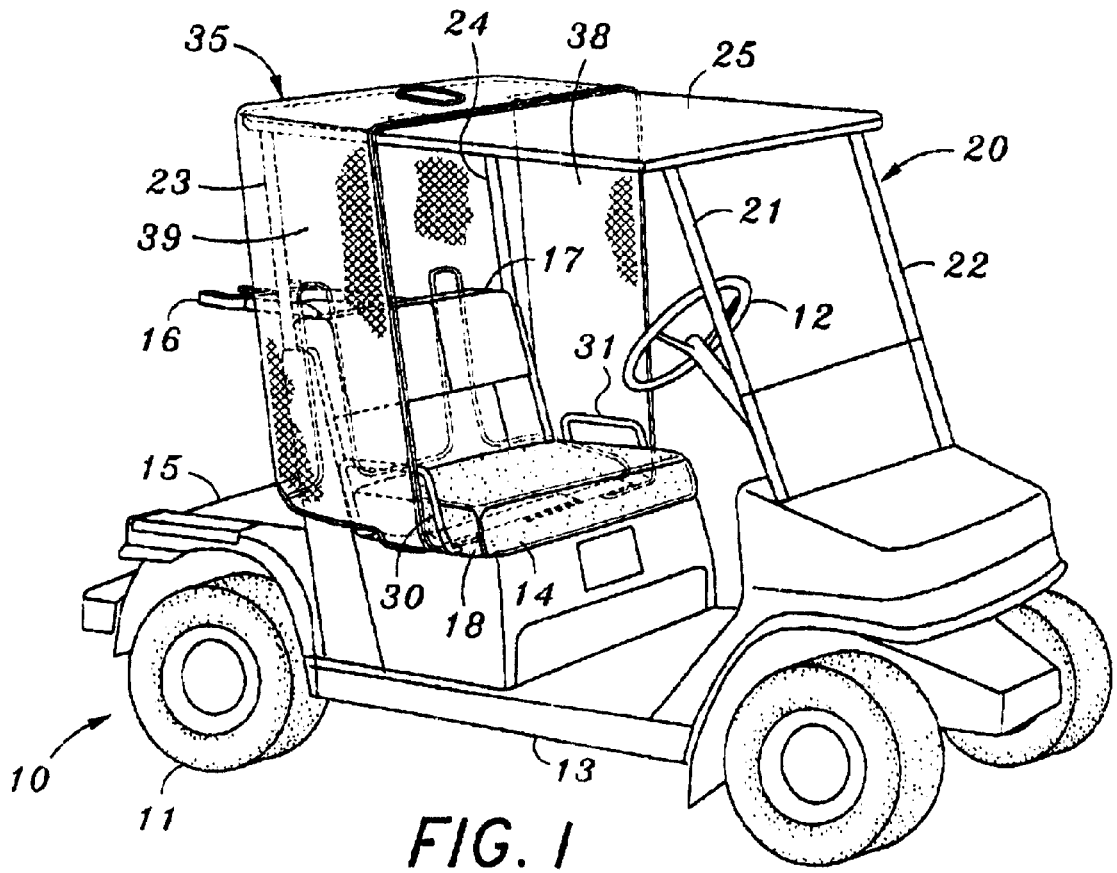
FIG. 1 is a perspective view of a golf cart carrying a shield according to this invention.
Figure 2:
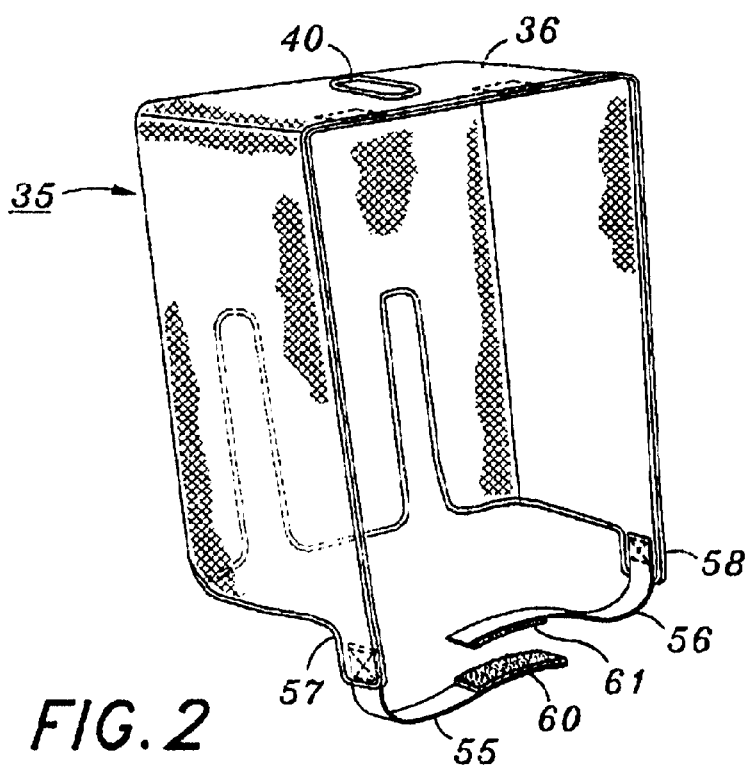
FIG. 2 is a perspective view of the shield of FIG. 1, with the golf cart removed for clarity of disclosure.
Figure 3:
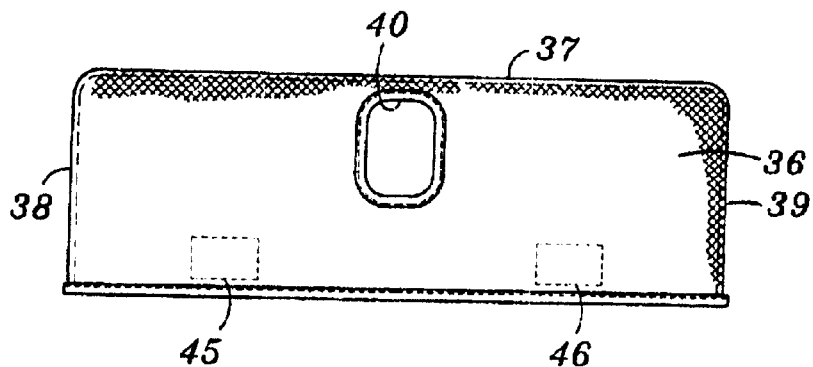
FIG. 3 is a top view of FIG. 2.
Figure 4:
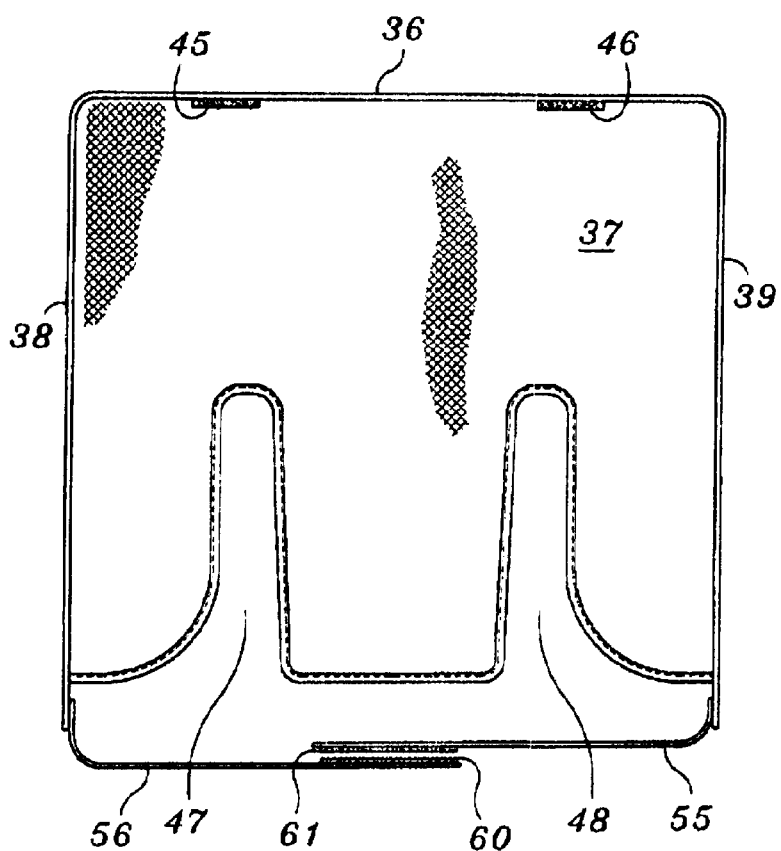
FIG. 4 is a top view of FIG. 3, particularly showing the rear panel.
Figure 5:
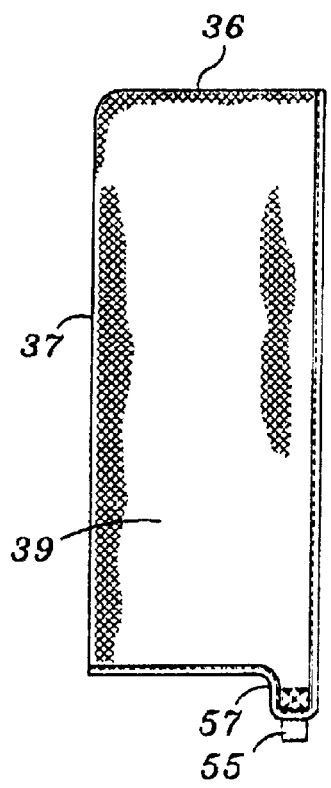
FIG. 5 is a side view of FIG. 4 showing the right side panel. The left side panel is its mirror image.

A conventional golf cart 10 is shown in FIG. 1. It includes wheels 11, steering gear 12, a chassis 13, and a seat 14. The seat can be pivoted to raise it for ready access to batteries or storage, and to enable this shield to be installed. A shelf 15 is provided to support golf bags (not shown) held in clamps 16. A back rest 17 is in back of a seat cushion 18. Propulsion means (not shown), such as an engine or a battery-motor combination is carried by the chassis.

A framework 20 is mounted to the chassis. It includes forward uprights 21, 22, sometimes with a windshield between them, two rearward uprights 23, 24, and an optional roof 25 joined to and supported by the uprights.

A pair of side rails 30 31 is provided on the chassis beside the seat. Each rail is made of tubular material bent to form an arch. It is rigid, and is rigidly attached to the chassis so the occupant can grab it when he gets into and out of the golf cart. It also serves to hold him in. More importantly it is structure that he can hold on to when the travel is over rough or uneven land. It is an important safety feature which is not occluded or impeded by this invention.

The shield 35 of this invention is best shown in FIGS. 2–5, It has a top panel 36, a rear panel 37, a left hand panel 38 and a right hand panel 39. The rear and side panels are joined to the top panel along the edge of the roof, and at the vertical intersections of the rear panel with the side panels.

An optional vent port 40 can be formed in the top panel if the shield is to be used on a golf cart that has only an open top framework without a solid roof. This permits the ready exit of wind.

A pair of fasteners 45, 46 are provided. These may be patches of Velcro on the frame (or roof) and on the shield to aid in positioning and holding the shield at the rear edge of the top panel. These also resist blowing off of the shield.

For convenience, two slots 47, 48 are formed in the rear panel. These enable the rear panel to be placed forwardly of the bag clamps, and to hang forwardly of bags in the clamp.

Retention straps 55 and 56 are attached to respective side panels, such as by stitching. Tabs 57, 58 on the side panels provide areas for their attachment. Joinders 60, 61 are attached, perhaps adhesively, to the ends of respective straps. Most conveniently they may be patches of cooperating parts of a Velcro fabric- hook and loop fastener, so that when they are pressed together, the straps form a binding making a reliable joint beneath the shield.

This shield is readily mounted to the golf cart. First the top and panels are placed over the framework or roof and the seat is raised. Generally it is pivotable to give access to batteries. With the straps separated, they are brought into the region that is beneath the seat when the seat is down and are pressed together to form a binding.

Importantly, they are brought down outside of the rails. This is an important safety feature because the rails remain inside the shield, available to the riders. Nothing covers or obscures it.

The joinders are attached together at a location which will nicely hold the shield down when the seat is lowered on it, and this completes the installation. The shield can be removed by raising the seat, separating the straps, and pulling it off of the golf cart.

The material of the shield is of importance to the invention. An opaque material is not suitable, because some transmissibility of image is needed for visibility. It is possible to use transparent organic plastic sheet material containing UV absorbing ingredients. However these tend to discolor and show dirt. Also, they tend to harden because of the heat and sunshine to which they are exposed. While useful they are not preferred.

Instead there exists a woven mesh material whose apertures permit enough of an image to pass that the driver can recognize obstacles and persons, even though the material of the mesh is essentially opaque. The material itself absorbs a large portion of the UV radiation, enough to provide valuable protection to the occupants while creating no risk of blinding them to obstacles. Its mesh form is also advantageous in venting hot air from the structure.

A known example of such material can be obtained from Twitchell, 4031 Ross Clark Circle NW, Dothan, Ala. 36304, under its Item No. T18BE. It is a solar screen fabric in a plain weave using 0.025 inches diameter vinyl coated 1000 denier polyester core yarns in warp and fill. About 80% coverage, 20% open.

This invention is not to be limited by the embodiment shown in the drawings and described in the description, which is given by way of example and not of limitation, but only in accordance with the scope of the appended claims.

I claim:

1. In combination:

a golf cart having a framework above a chassis, a seat on said chassis which can be raised and lowered, and an arched railing mounted to the chassis at each side of the seat; and a shield mounted to said golf cart comprising a top panel, a rear panel, and a pair of opposite side panels, edges of said panels being attached to edges of said framework and to each other surrounding a portion of said framework and mounted thereto; an elongated strap attached to each side panel; a joinder on each side strap; said straps having length sufficient to enable their joinders to be joined to form a releasable binding that holds down the side panels when the seat is down and a portion of the binding is passed beneath it.

2. A combination according to claim 1 in which said joinders are cooperating portions of hook and loop fabric.

* * * * *